(12) United States Patent
Haruyama

(10) Patent No.: US 10,451,366 B2
(45) Date of Patent: Oct. 22, 2019

(54) HEAT-EXCHANGING AND MIXING DEVICE AND SOLUTION TRANSPORT AND COOLING UNIT

(71) Applicant: Hideyuki Haruyama, Matsudo (JP)

(72) Inventor: Hideyuki Haruyama, Matsudo (JP)

(*) Notice: Subject to any disclaimer, the term of this patent is extended or adjusted under 35 U.S.C. 154(b) by 0 days.

(21) Appl. No.: 15/510,057

(22) PCT Filed: Apr. 1, 2016

(86) PCT No.: PCT/JP2016/060924
§ 371 (c)(1),
(2) Date: Mar. 9, 2017

(87) PCT Pub. No.: WO2017/085943
PCT Pub. Date: May 26, 2017

(65) Prior Publication Data
US 2017/0299285 A1 Oct. 19, 2017

(30) Foreign Application Priority Data
Nov. 20, 2015 (JP) ................................. 2015-227929

(51) Int. Cl.
*F28F 1/40* (2006.01)
*F28F 9/02* (2006.01)
(Continued)

(52) U.S. Cl.
CPC .............. *F28F 13/12* (2013.01); *B01J 19/24* (2013.01); *C08F 2/01* (2013.01); *F28D 7/16* (2013.01);
(Continued)

(58) Field of Classification Search
CPC ........ F28F 1/00; F28F 1/10; F28F 1/40; F28F 13/00; F28F 13/06; F28F 13/12;
(Continued)

(56) References Cited

U.S. PATENT DOCUMENTS 3,854,530 A * 12/1974 Jouet .................... B21D 53/027
165/110
4,353,350 A * 10/1982 Albrecht ............... F24B 1/1886
126/522
(Continued)

FOREIGN PATENT DOCUMENTS

JP 57-120097 A 7/1982
JP 61-175788 U 11/1986
(Continued)

OTHER PUBLICATIONS

Machine translation of JP 57-120097 A, provided in IDS filed Mar. 9, 2017 and published Jul. 26, 1982.*
(Continued)

*Primary Examiner* — Natasha E Young
(74) *Attorney, Agent, or Firm* — Westerman, Hattori, Daniels & Adrian, LLP

(57) ABSTRACT

Provided is a heat-exchanging and mixing device and a solution transport and cooling unit which are capable of efficiently performing heat transfer with respect to a heat-exchange target, while stirring and mixing the heat-exchange target, to obtain an advantageous effect of being able to significantly hinder accumulation of a solid content in the solution transport and cooling unit. The heat-exchanging and mixing device comprises a heat exchanger tube and a spiral mixing member having a width approximately equal to an inner diameter of the heat exchanger tube and disposed inside the heat exchanger tube. The spiral mixing member is comprised of a strip-shaped member having an inter-slit region.

13 Claims, 9 Drawing Sheets

(51) Int. Cl.

| | | |
|---|---|---|
| *F28F 19/00* | (2006.01) | |
| *F28F 21/08* | (2006.01) | |
| *B01J 19/24* | (2006.01) | |
| *C08F 2/01* | (2006.01) | |
| *F28D 7/16* | (2006.01) | |
| *F28D 21/00* | (2006.01) | |
| *F28F 13/12* | (2006.01) | |
| *F28F 9/22* | (2006.01) | |

(52) U.S. Cl.
CPC ............. *F28F 1/40* (2013.01); *F28F 9/0239* (2013.01); *F28F 19/00* (2013.01); *F28F 21/08* (2013.01); *B01J 2208/00256* (2013.01); *F28D 2021/0022* (2013.01); *F28F 2009/226* (2013.01); *F28F 2255/12* (2013.01)

(58) Field of Classification Search
CPC .. F28F 19/00; F28F 21/00; F28F 21/08; B01J 19/00; B01J 19/24; B01J 2208/00–00017; B01J 2208/00106; B01J 2208/00168; B01J 2208/00256; C08F 2/00; C08F 2/01; F28D 7/00; F28D 7/16; F28D 21/00; F28D 2021/0019; F28D 2021/0022
See application file for complete search history.

(56) References Cited

U.S. PATENT DOCUMENTS

| | | | | |
|---|---|---|---|---|
| 4,985,584 | A * | 1/1991 | Millar | C06B 25/00 525/333.2 |
| 5,404,681 | A * | 4/1995 | Scheider | B24D 13/04 451/466 |
| 6,962,193 | B2 * | 11/2005 | Liu | B01D 53/8675 138/38 |
| 8,119,708 | B2 * | 2/2012 | Weitzel | C08F 2/002 523/343 |
| 2007/0144631 | A1 | 6/2007 | Clavenna et al. | |
| 2007/0158054 | A1 | 7/2007 | Greaney et al. | |
| 2007/0178322 | A1 | 8/2007 | Chun et al. | |
| 2007/0187078 | A1 | 8/2007 | Greaney et al. | |
| 2007/0207329 | A1 | 9/2007 | Chun et al. | |
| 2008/0264615 | A1 | 10/2008 | Van Hees | |
| 2009/0183857 | A1 * | 7/2009 | Pierce | F28F 1/405 165/109.1 |
| 2011/0105802 | A1 * | 5/2011 | Villa | C08G 65/2609 568/679 |
| 2011/0112218 | A1 | 5/2011 | Weitzel et al. | |
| 2011/0174470 | A1 * | 7/2011 | Chang | F28D 7/04 165/163 |
| 2011/0277888 | A1 | 11/2011 | Chun et al. | |
| 2012/0095167 | A1 | 4/2012 | Nagai et al. | |
| 2012/0246935 | A1 | 10/2012 | Greaney et al. | |
| 2012/0273091 | A1 | 11/2012 | Chun et al. | |

FOREIGN PATENT DOCUMENTS

| | | |
|---|---|---|
| JP | 62-034680 U | 2/1987 |
| JP | 04-029250 Y2 | 7/1992 |
| JP | 5-93001 A | 4/1993 |
| JP | 05-039333 Y2 | 10/1993 |
| JP | 10-204668 A | 8/1998 |
| JP | 2010-6988 A | 1/2010 |
| JP | 2012-232512 A | 11/2012 |
| JP | 2013-11437 A | 1/2013 |
| JP | 5399478 B2 | 1/2014 |
| KR | 10-2007-0104400 A | 10/2007 |
| KR | 10-2010-0046033 A | 5/2010 |

OTHER PUBLICATIONS

Matsumura et al., "Technical Manual Polyethylene", Industrial Investigation Assembly, Jul. 1, 2001, pp. 120, w/English translation (4 pages).
International Search Report dated Oct. 5, 2016, issued in counterpart application No. PCT/JP2016/060924. (3 pages).
Office Action dated Apr. 13, 2018, issued in counterpart Korean Application No. 10-2017-7008454, with English translation. (19 pages).

* cited by examiner

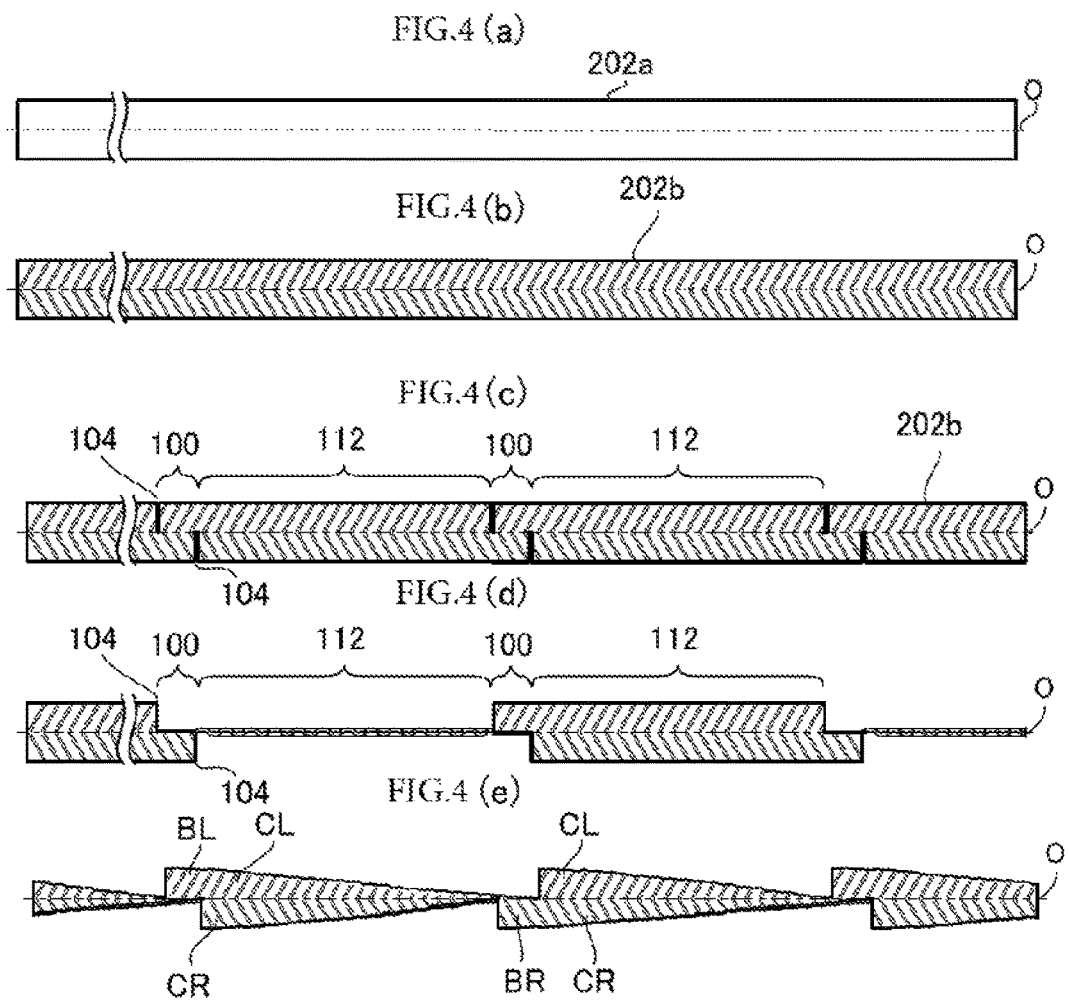
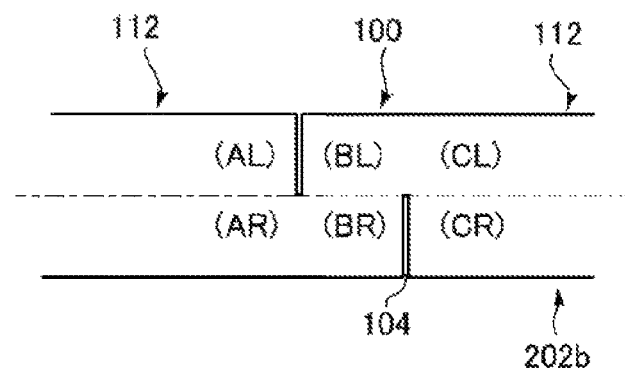

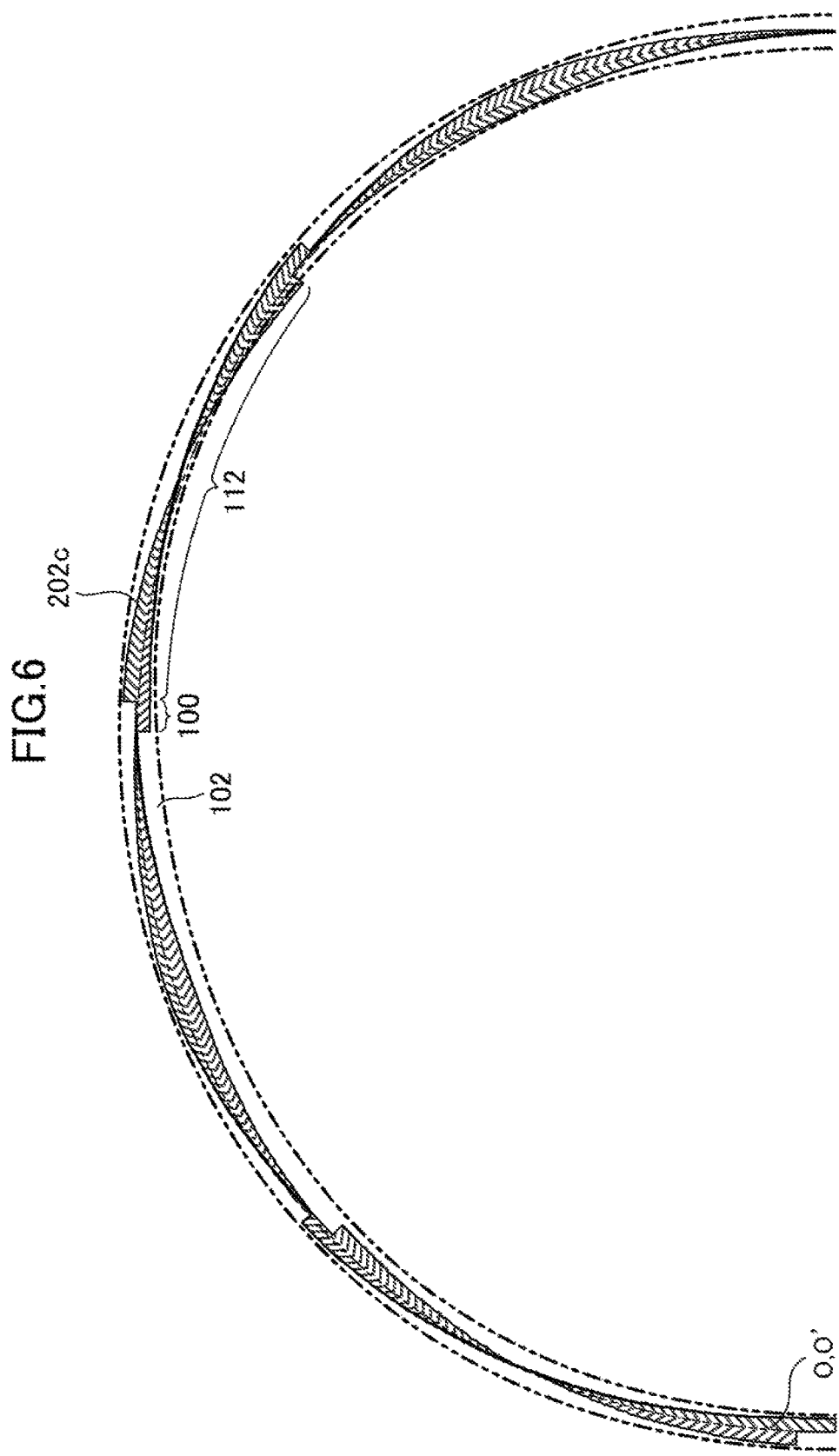

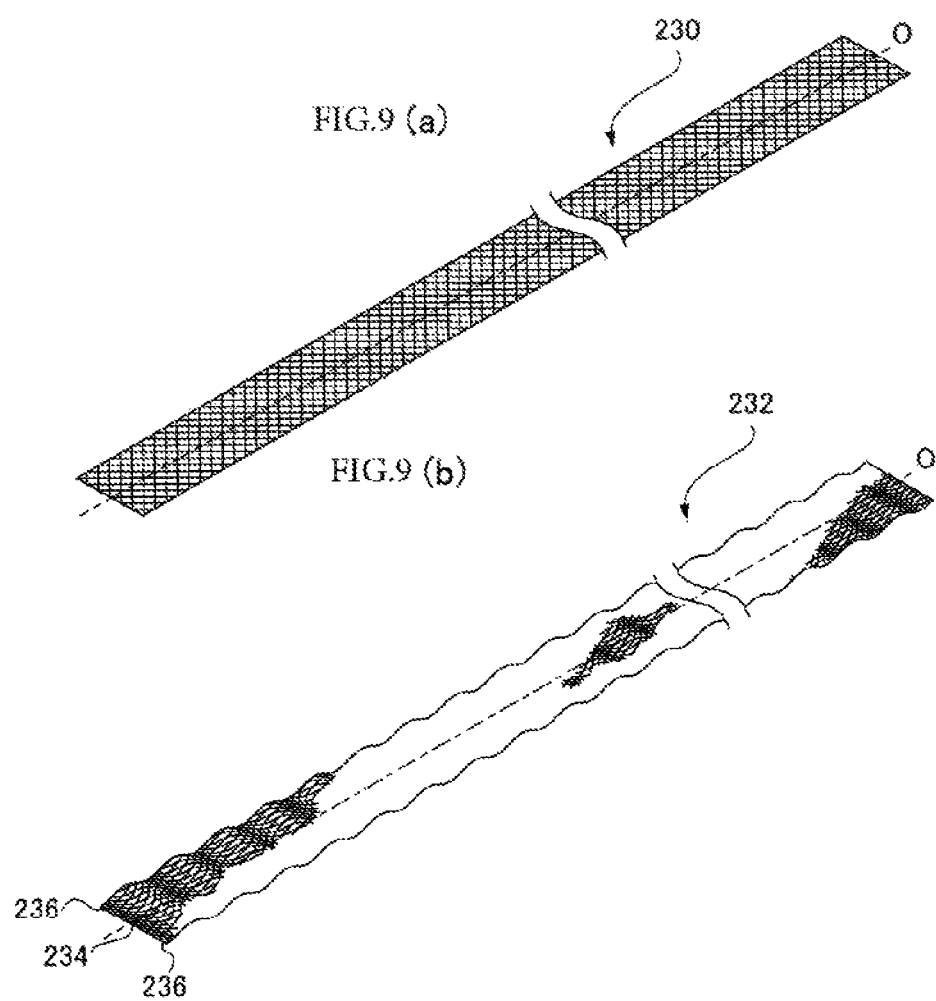

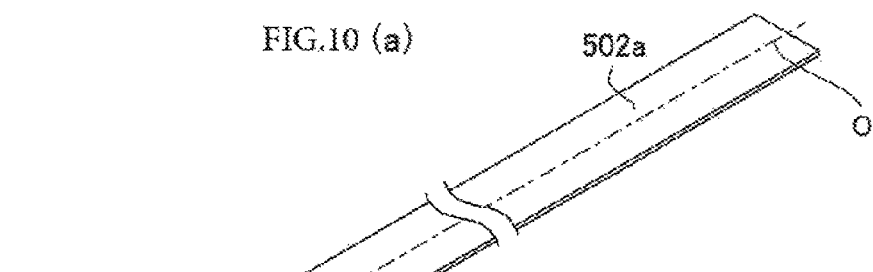
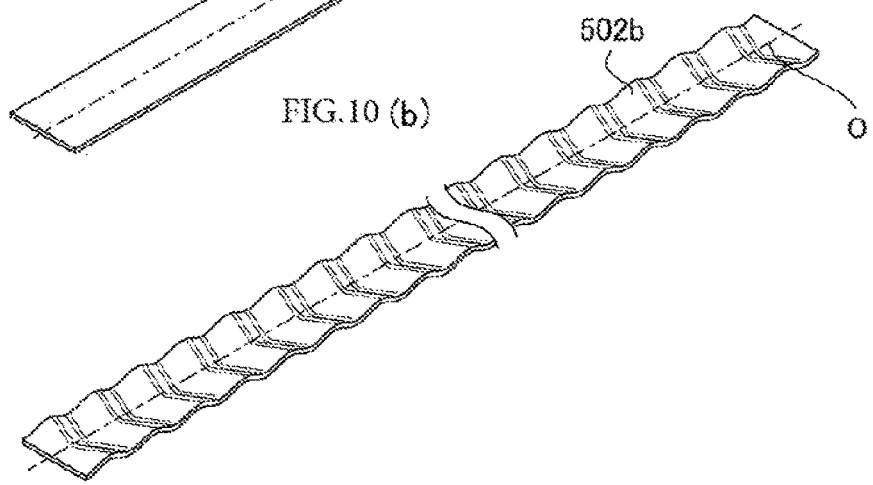
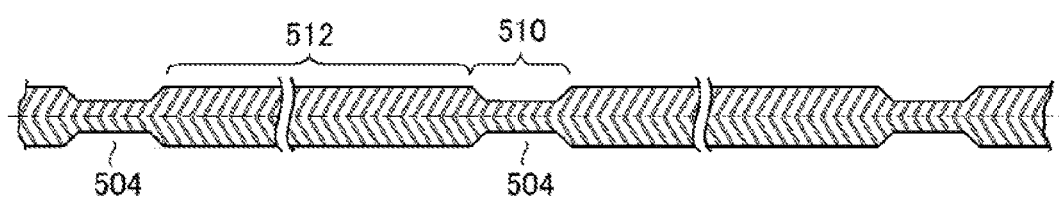
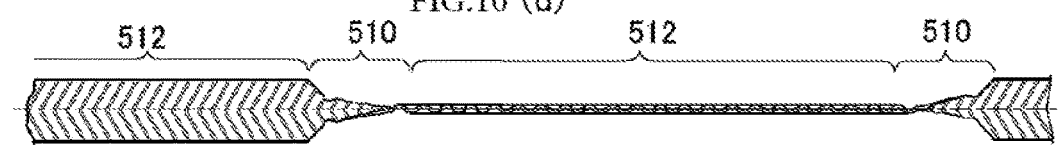
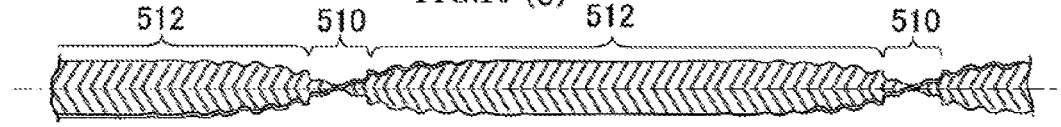

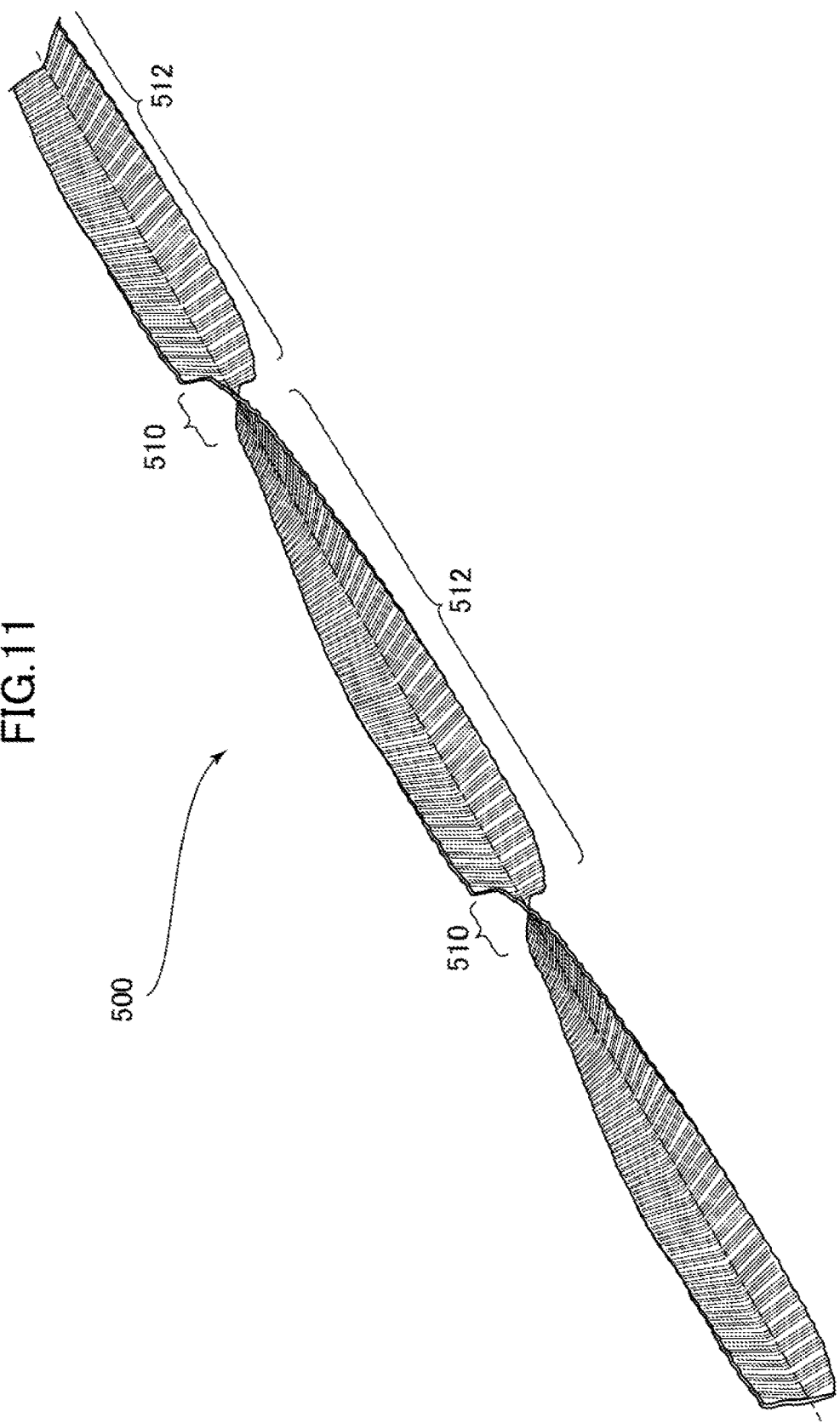

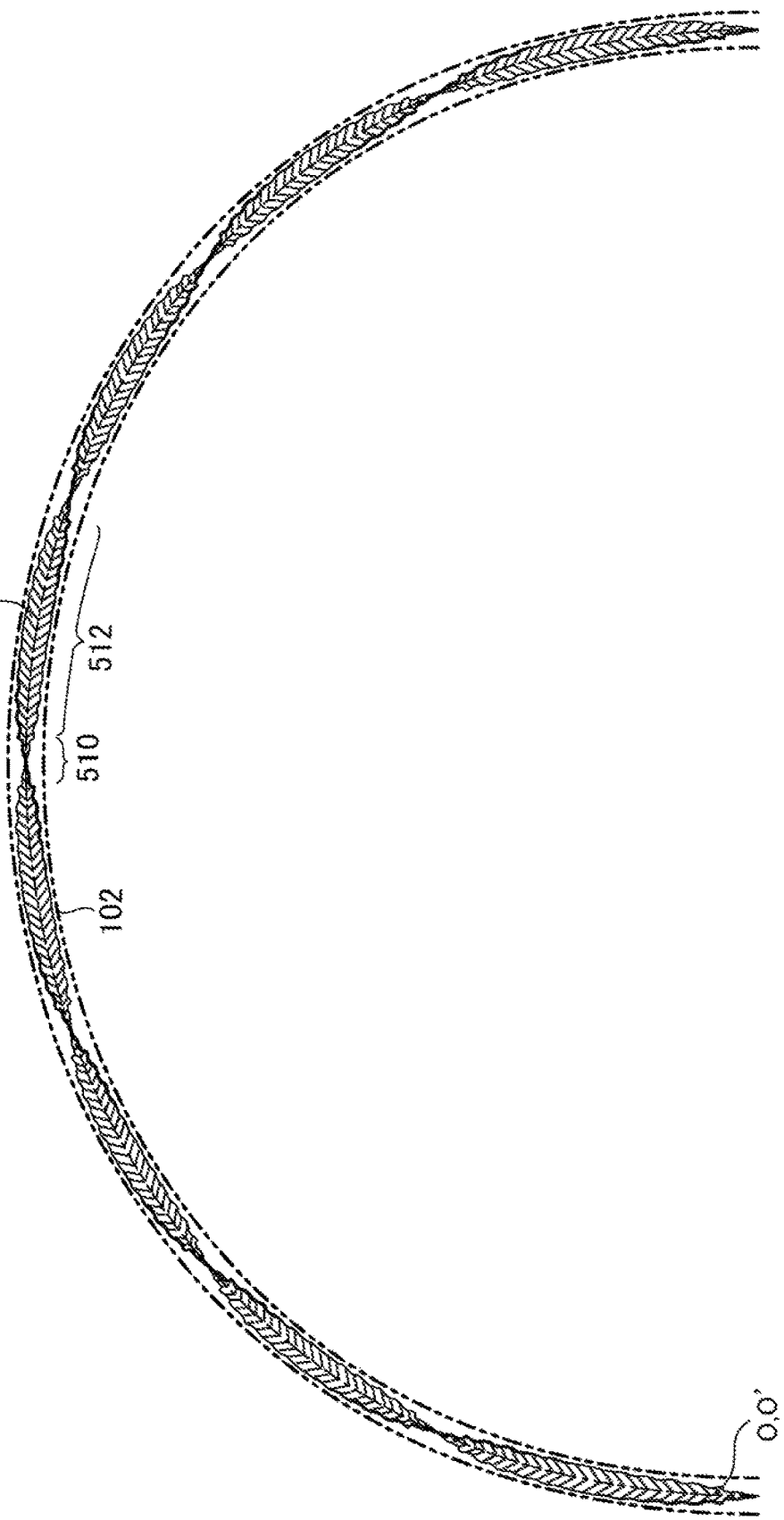

HEAT-EXCHANGING AND MIXING DEVICE AND SOLUTION TRANSPORT AND COOLING UNIT

CROSS-REFERENCE TO RELATED APPLICATIONS

This application is a U.S. national stage application of International Patent Application No. PCT/JP2016/060924, published as WO 2017/085943, filed on Apr. 1, 2016, which claims priority to Japanese Patent Application No. JP 2015-227929, filed on Nov. 20, 2015, which is hereby expressly incorporated by reference in its entirety.

TECHNICAL FIELD

The present invention relates to a heat-exchanging and mixing device and a solution transport and cooling unit, and more specifically to a heat-exchanging and mixing device and a solution transport and cooling unit which are capable of efficiently performing heat transfer with respect to a heat-exchange target, while stirring and mixing the heat-exchange target.

BACKGROUND ART

It is widely performed to cool or heat a heat-exchange target by passing a flow of the heat-exchange target through a pipe made of a material having a high thermal conductivity, while brining a cooling medium or a high-temperature fluid into contact with an outer periphery of the pipe. It is also commonly performed to heat a material as a heat-exchange target to a temperature for efficiently performing processing or treatment thereof, and then subject the heated material to the processing or treatment.

Meanwhile, when producing a polymer product such as polyethylene or polypropylene, e.g., when producing polyethylene by inducing, in a polymerization reactor, a reaction between a catalyst and ethylene dissolved in a solvent such as n-hexane, the resulting polyethylene as a polymer product adheres to an inner wall of the polymerization reactor. Further, when transporting, under cooling, a mixed solution of the polymerization product and the solvent from the polymerization reactor to a post-processing apparatus such as a pelletizer, a phenomenon that the polymer product precipitates and adheres to an inner wall of a means for the transport occurs to form so-called "polymer fouling".

Moreover, in the polymerization of polyethylene or the like, there is a problem that reaction heat is generated in the polymerization reactor through the polymerization reaction. If this reaction heat is not efficiently removed, i.e., cooling is not efficiently performed, running conditions for the polymerization reactor cannot be controlled, thereby possibly causing a situation where physical properties of a polymerization reaction product are significantly changed and thus the polymerization reactor is forced to be shut down.

For removing the above reaction heat, there are some cases where a shell-and-tube heat exchanger is provided in the inner wall of the polymerization reactor, and the transport means for transporting, under cooling, the solution from the polymerization reactor to the post-processing apparatus such as a pelletizer. In these cases, a polymer fouling is formed on inner walls of a plurality of metal tubes for separating the polymer contained in the solvent from a coolant, in the shell-and-tube heat exchanger.

This polymer fouling causes significant deterioration in removal of the reaction heat, i.e., cooling, because it has a thermal conductivity which is less than that of the metal tube by about two digits. At the same time, a substantial tube diameter of each of the metal tubes becomes smaller, thereby causing negative effects, such as an increase in load of a transport pump, damage to transport pump, and deterioration in production efficiency due to a decrease in flow rate.

With a view to preventing the formation of and buildup of a polymer fouling, there have been proposed the following measures:
(1) Increasing a flow velocity in a reactor and a transport tube;
(2) Minimizing irregularities in an inner surface of each of the reactor and the transport tube;
(3) Adding an electrostatic remover based on a technical analysis indicating that an origin of the polymer fouling is electrostatic adhesion of catalyst and polymer particles;
(4) Improving a structure of an ethylene feed nozzle;
(5) Providing an improved structure capable of preventing the polymer from stagnating around a gap between flanges and the like (See, for example, the following Non-Patent Document 1).

Further, as one conventional means to prevent the formation of a polymer fouling, there has been proposed a technique of adding an anti-fouling agent to a composition of a solution of a polymer dissolved in a solvent, in a polymerization apparatus or a subsequent process, wherein the anti-fouling agent contains a polyoxyalkylene-based polymer having a number average molecular weight of 30000 or less and represented a specific general formula (see, for example, the following Patent Document 1).

As another conventional means to prevent the formation of a polymer fouling, there has been proposed an olefin polymerization method capable of preventing clogging of a line for supplying catalyst slurry to a polymerization reactor to enable continuous running of a polymerization reactor, wherein, when supplying catalyst slurry containing a pre-polymerization catalyst supported on a solid, to a gas-phase reactor for performing a final olefin polymerization, the catalyst slurry is accompanied by 0.3 to 3.0 mg of an organic aluminum compound with respect to 1 g of the pre-polymerization catalyst (see, for example, the following Patent Document 2).

As yet another conventional means to prevent the formation of a polymer fouling, there has been proposed a heat transfer device 10 for heating or cooling a process stream having an inner surface and an outer surface, to provide resistance to corrosion and corrosion-induced fouling, to a metal tube heat exchanger exposed to the process stream at high temperatures, wherein the heat transfer device 10 is a tube formed of a steel alloy comprising X, Y, and Z, wherein the tube comprises three layer consisting of: a substrate layer made of a steel alloy having an arithmetic average roughness of less than 40 micro inches (1.1 μm); a chromium enriched oxide layer formed on at least one of the inner surface and the outer surface, wherein the chromium enriched oxide layer contains 10 to 40 weight % of chromium; and a surface protective layer formed on the chromium enriched oxide layer, wherein the surface protective layer contains sulfide, oxide, oxysulfide or a mixture thereof (see, for example, the following Patent Document 3).

The above conventional techniques are incapable of effectively preventing or reducing the formation of a polymer fouling to an extent that they satisfy industrial requirements. Therefore, still other measures or techniques have been proposed. Specifically, there has been proposed a technique of adhering and forming a thin film onto an inner wall of a metal pipe, wherein the thin film is capable of being removed by chemical liquid or desired gas (see, for example, the following Patent Document 4).

As another further conventional means to prevent the formation of a polymer fouling, there has been proposed a scale removal method which comprises performing a chemical operation or a physical operation using a container having a resin film formed on an inner wall thereof, and then removing a scale produced on the resin film on the inner wall of the container during a process of the operation, together with the resin film (see, for example, the following Patent Document 5).

As still a further conventional means to prevent the formation of a polymer fouling, there has been proposed an installation method for a piping inner tube to be installed inside a pipe for sending a liquid or paste-form fluid, wherein the method comprises: penetratingly placing the tube inside the pipe; closing one of opposite edges of the tube and sending gas from the other edge into the tube to thereby expand the tube and bring the tube into close contact with an inner surface of the pipe; and fixing opposite ends of the tube to respective ends of the pipe while keeping the ends of the tube in close contact with the respective ends of the pipe (see, for example, the following Patent Document 6).

CITATION LIST

Non-Patent Document

Non-Patent Document 1: Kazuo MATSUURA, Hisataka MIKAMI, "Technical Manual Polyethylene", Kogyo Chosakai Publishing Co., Ltd., Jul. 1, 2001

Patent Document

Patent Document 1: JP 5399478B
Patent Document 2: JP 2010-006988A
Patent Document 3: JP 2013-011437A
Patent Document 4: JP 10-204668A
Patent Document 5: JP 05-093001A
Patent Document 6: JP 2012-232512A

SUMMARY OF INVENTION

Technical Problem

As described in the Non-Patent Document 1, the formation of a polymer fouling is considered to be solved physically, e.g., by means of passing of the flow at high velocities, formation of a protective layer on a contact surface with the flow, prevention of the occurrence of stagnation of the flow, or chemically, e.g., by means of addition of an antistatic agent (electrostatic remover).

In reality, however, all of the measures against the formation of a polymer fouling, proposed in the above Patent Documents, are imperfect. Therefore, deterioration in cooling efficiency due to the formation of a polymer fouling, and narrowing of a flow passage, i.e., a reduction in flow rate, due to a polymer fouling, are still left as a serious obstruction in the industry.

The techniques proposed by the Patent Documents 4 and 5 involves an unacceptable problem in terms of quality control, because the thin film or the resin film preliminarily formed on the inner wall is highly likely to melt or peel due to a change of running conditions or the like, causing incorporation into a newly-produced polymer.

The technique proposed by the Patent Document 6 is considered to be substantially industrially impracticable, because the flexible inner tube stored in a roll form has significant difficulty in being installed over the entire length (e.g., about 10 m) of each of a bundle of cylindrical tubes in a transport unit.

In a polymer transport and cooling unit as an actual example in which formation of a polymer fouling has been ascertained by the present inventor, about one thousand five hundred SUS 304 cylindrical tubes each having an outer diameter of 35.4 mm, a wall thickness of 1.2 mm and a length of 10 m are fixed in a uniform pitch to form a cylinder tube bundle within a circular cross-section of a pressure-resistant shell having a diameter of 170 cm.

This cylinder tube bundle is entirely installed inside the pressure-resistant shell, and a coolant is pressure-fed from an inlet provided in a lower portion of the shell to flow between the bundled cylinder tubes. The coolant flows around each of the cylindrical tubes to cool a mixed solution of a polymer and a solvent in each of the cylindrical tubes.

The polymer which has become oversaturated by the cooling precipitates and separates from the solvent, and partially adheres to and grows on an inner wall of the tube to form a fouling. As a result, the liquid-solid mixed solution will be passed through the cylindrical tubes each having a narrowed flow passage, so that a pumping rate of a constant-pressure pump is lowered and thus it becomes impossible to perform steady running.

Specifically, the aforementioned polymer solution transport and cooling unit is generally continuously run for 24 hours. In this case, after an elapse of about 6 months to one year, a polymer fouling which has precipitated and accumulated on the inner wall of the each of the cylindrical tubes exponentially increases to a level which extremely hinders a flow of the polymerization product solution. As a result, a discharge rate of the constant-pressure pump is lowered and thus it becomes impossible to ensure steady running conditions. Thus, it becomes necessary to shut down the transport and cooling unit to remove the polymer fouling.

The polymer fouling removing task inevitably required in the conventional polymer transport and cooling unit is mostly performed industrially by high-pressure water cleaning.

In the high-pressure water cleaning, high-pressure water pressurized by a reciprocating pump is jetted from a nozzle to cause an accumulated polymer fouling to be peeled off from the tube wall, fragmented and discharged/removed, by means jet impact energy.

Moreover, in case of using a constant-pressure pump, the hindering of the flow by the polymer fouling causes a rise in discharge rate of the pump, thereby possibly leading to sudden stop of a pump motor due to overload thereof.

For example, a pressure value of the high-pressure water may be set to a high pressure of 7 MPa to less than 30 MPa, or an ultrahigh pressure of 30 MPa to less than 100 MPa, or an ultra-ultrahigh pressure of 100 MPa to less than 250 MPa. According to "Industrial Cleaning (High-Pressure Cleaning Task)-Guideline of Management for Safety and Health" published by the Japan Wash Inc., Association, the high-pressure water cleaning has to be performed by an operator who has taken a certification test, in the presence of an observer and on a strong scaffold.

In cleaning of one polymer transport and cooling unit, it needs to take two weeks or more for operations between installation of the scaffold and completion of inspection, in some cases. Moreover, the production of a polymer needs to be stopped during the high-pressure water cleaning, causing loss from non-running. This is an obstruction having a significantly great influence on industrial activities.

This polymer transport and cooling unit is a pressure container, so that it is required to carry out a periodic inspection, according to the regulation, i.e., the safety standards.

Object of Invention

In view of the above problems which are involved in a heat-exchanging and mixing device and a solution transport and cooling unit used, for example, in a polymer production line, and which have not been solved by the conventional techniques, it is an object of the present invention to provide a heat-exchanging and mixing device and a solution transport and cooling unit which are capable of efficiently performing heat transfer with respect to a heat-exchange target, while stirring and mixing the heat-exchange target, to obtain an advantageous effect of being able to significantly hinder accumulation of a solid content in the solution transport and cooling unit.

It is another object of the present invention to provide a heat-exchanging and mixing device and a solution transport and cooling unit which are capable of, even when a solid content is accumulated in the heat-exchanging and mixing device, removing the accumulated fouling by a significantly simplified task facility and a smaller number of site workers, within a shorter period of time, as compared to the conventional techniques, and further without performing any hazardous task such as high-pressure water cleaning.

It is yet another object of the present invention to provide a heat-exchanging and mixing device and a solution transport and cooling unit which are less likely to cause a risk that an undesirable in-tube fouling such as a polymer is incorporated in a solution such as a newly-produced liquid-solid mixture.

It is still another object of the present invention to provide a heat-exchanging and mixing device and a solution transport and cooling unit which are significantly reduced in amount of industrial waste, as compared to an amount of industrial waste generated by the conventional technique requiring high-pressure water.

Solution to Technical Problem

According to a first aspect of the present invention, there is provided a heat-exchanging and mixing device which comprises a heat exchanger tube and a spiral mixing member having a width approximately equal to an inner diameter of the heat exchanger tube and disposed inside the heat exchanger tube, wherein the spiral mixing member is comprised of a strip-shaped member having an inter-slit region in which a pair of slits are provided along respective longitudinally spaced-apart boundary lines to alternately extend from respective given ones of opposite edges to a widthwise central region of the strip-shaped member; wherein, on an assumption that: a right half portion and a left half portion of the strip-shaped member located upstream of the inter-slit region are defined, respectively, as an upstream strip portion AR and an upstream strip portion AL; a right half portion and a left half portion of the inter-slit region of the strip-shaped member are defined, respectively, as an inter-slit strip portion BR and an inter-slit strip portion BL; and a right half portion and a left half portion of the strip-shaped member located downstream of the inter-slit region are defined, respectively, as a downstream strip portion CR and a downstream strip portion CL, the inter-slit strip portion BR and the inter-slit strip portion BL are relatively bent to form a given angle therebetween, in such a manner that, in the inter-slit region and a vicinity thereof, the upstream strip portion AR, the upstream strip portion AL and the inter-slit strip portion BR form a flat surface, and the downstream strip portion CR, the downstream strip portion CL and the inter-slit strip portion BL form a flat surface; and wherein a portion of the strip-shaped member other than the inter-slit region is at least partially formed in a spiral shape.

According to a second aspect of the present invention, there is provided a solution transport and cooling unit which comprises: a cooling medium shell; a plurality of heat exchanger tubes disposed inside the cooling medium shell to extend parallel to each other; and a spiral mixing member having a width approximately equal to an inner diameter of each of the heat exchanger tubes and disposed inside each of the heat exchanger tubes, wherein the spiral mixing member is comprised of a strip-shaped member having an inter-slit region in which a pair of slits are provided along respective longitudinally spaced-apart boundary lines to alternately extend from respective given ones of opposite edges to a widthwise central region of the strip-shaped member; wherein, on an assumption that: a right half portion and a left half portion of the strip-shaped member located upstream of the inter-slit region are defined, respectively, as an upstream strip portion AR and an upstream strip portion AL; a right half portion and a left half portion of the inter-slit region of the strip-shaped member are defined, respectively, as an inter-slit strip portion BR and an inter-slit strip portion BL; and a right half portion and a left half portion of the strip-shaped member located downstream of the inter-slit region, when views in a downstream direction, are defined, respectively, as a downstream strip portion CR and a downstream strip portion CL, the inter-slit strip portion BR and the inter-slit strip portion BL are relatively bent to form a given angle therebetween, in such a manner that, in the inter-slit region and a vicinity thereof, the upstream strip portion AR, the upstream strip portion AL and the inter-slit strip portion BR form a flat surface, and the downstream strip portion CR, the downstream strip portion CL and the inter-slit strip portion BL form a flat surface; and wherein a portion of the strip-shaped member other than the inter-slit region is at least partially formed in a spiral shape.

Effect of Invention

The present invention can be constructed as a heat-exchanging and mixing device and a solution transport and cooling unit which are capable of efficiently performing heat transfer with respect to a heat-exchange target, while stirring and mixing the heat-exchange target, to obtain an advantageous effect of being able to significantly hinder accumulation of a solid content in the solution transport and cooling unit.

The present invention can also be constructed as a heat-exchanging and mixing device and a solution transport and cooling unit which are capable of, even when a solid content is accumulated in the heat-exchanging and mixing device, removing the accumulated fouling by a significantly simplified task facility and a smaller number of site workers, within a shorter period of time, as compared to the conventional techniques, and further without performing any hazardous task such as high-pressure water cleaning.

In addition, the present invention can be constructed as a heat-exchanging and mixing device and a solution transport and cooling unit which are less likely to cause a risk that an undesirable in-tube fouling such as a polymer is incorporated in a solution such as a newly-produced liquid-solid mixture.

Further, the present invention can be constructed as a heat-exchanging and mixing device and a solution transport and cooling unit which are significantly reduced in amount of industrial waste, as compared to the conventional technique requiring high-pressure water cleaning.

Thus, the heat-exchanging and mixing device and the solution transport and cooling unit of the present invention can obtain an advantageous effect of being free from a risk that an undesirable impurity such as an existing polymer adhered to an inner wall of the heat exchanger tube is incorporated in a transport and cooling-target solution such as a newly-produced polymer solution.

In addition, the heat-exchanging and mixing device and the solution transport and cooling unit of the present invention can obtain an advantageous effect of being able to significantly reduce an amount of industrial waste, as compared to an amount of industrial waste, as compared to the conventional technique requiring high-pressure water cleaning.

Examples of suitable application of the heat-exchanging and mixing device and the solution transport and cooling unit of the present invention of the present invention include solution transport during a process of a chemical operation such as polymerization reaction or cross-linking reaction in production of a polymer, and solution transport during a process of a physical operation such as solvent removal or mixing. The present invention can also be applied to production, for example, of a composition consisting, mainly, of a polymer such as a coating material or an adhesive, to transport a solvent during a process of a physical operation such as mixing the polymer with another component, or solvent removal.

The present invention is applicable to solution transport during production of a polymer, such as (metha) acrylic acid ester-based polymer including poly (metha) methyl acrylate, poly (metha) ethyl acrylate or poly (metha) butyl acrylate; urethane-based polymer; vinyl chloride-based polymer; vinylidene chloride-based polymer; SBR; or vinyl acetate polymer, or a copolymer of monomers constituting these polymers, and is also suitably applicable to solution transport for an emulsion such as urethane emulsion or acrylic emulsion.

Embodiments of Invention

In the first and second aspects of the present invention, the heat exchanger tube may be bent or curved.

In the first and second aspects of the present invention, the spiral mixing member may be composed of a plate-like member having stretchability in a longitudinal direction thereof.

In the first and second aspects of the present invention, the spiral mixing member may be composed of a plate-like member having an undulated shape in a longitudinal direction thereof and a non-undulated shape in a lateral direction thereof.

In the first and second aspects of the present invention, the spiral mixing member may be composed of a plate-like member having an undulated shape in a longitudinal direction thereof and a non-undulated shape in a lateral direction thereof.

In the first and second aspects of the present invention, the spiral mixing member may be composed of a mesh sheet, wherein the mesh sheet may be woven such that a tensile resistance in opposite edge regions extending in a longitudinal direction thereof becomes greater than a tensile resistance in a central region extending in the longitudinal direction thereof.

In the first and second aspects of the present invention, the spiral mixing member may have an array of dimples arranged from right and left edges thereof toward a central axis of the heat exchanger tube.

In the first and second aspects of the present invention, the spiral mixing member may be made of a stainless alloy.

In the first and second aspects of the present invention, the spiral mixing member may be made of an aluminum alloy.

In the first and second aspects of the present invention, the spiral mixing member may be made of a copper alloy.

In the first and second aspects of the present invention, the spiral mixing member may be made of a titanium alloy.

In the first and second aspects of the present invention, the spiral mixing member may be made of a nickel alloy.

According to a third aspect of the present invention, there is provided a polymer production apparatus which comprises a polymerization reactor, and a cooling flow passage unit having a heat exchange function and coupled to a polymerization product outlet of the polymerization reactor, wherein the cooling flow passage unit comprises: a cooling medium shell; a plurality of heat exchanger tubes disposed inside the cooling medium shell to extend parallel to each other; and a spiral mixing member having a width approximately equal to an inner diameter of each of the heat exchanger tubes and disposed inside each of the heat exchanger tubes, wherein the spiral mixing member is comprised of a strip-shaped member having an inter-slit region in which a pair of slits are provided along respective longitudinally spaced-apart boundary lines to alternately extend from respective given ones of opposite edges to a widthwise central region of the strip-shaped member; wherein, on an assumption that: a right half portion and a left half portion of the strip-shaped member located upstream of the inter-slit region, as views in a downstream direction, are defined, respectively, as an upstream strip portion AR and an upstream strip portion AL; a right half portion and a left half portion of the inter-slit region of the strip-shaped member are defined, respectively, as an inter-slit strip portion BR and an inter-slit strip portion BL; and a right half portion and a left half portion of the strip-shaped member located downstream of the inter-slit region, as views in the downstream direction, are defined, respectively, as a downstream strip portion CR and a downstream strip portion CL, the inter-slit strip portion BR and the inter-slit strip portion BL are relatively bent to form a right angle therebetween, in such a manner that, in the inter-slit region and a vicinity thereof, the upstream strip portion AR, the upstream strip portion AL and the inter-slit strip portion BR form a flat surface, and the downstream strip portion CR, the downstream strip portion CL and the inter-slit strip portion BL form a flat surface; and wherein a portion of the strip-shaped member other than the inter-slit region is at least partially formed in a spiral shape.

According to a fourth aspect of the present invention, there is provided a heat-exchanging and mixing device which comprises a heat exchanger tube and a spiral mixing member having a width approximately equal to or slightly less than an inner diameter of the heat exchanger tube and disposed inside the heat exchanger tube, wherein the spiral mixing member is comprised of a strip-shaped member having a full-width region and a narrowed-width region, wherein the narrowed-width region has two cutouts each formed over a given length in a longitudinal direction of the strip-shaped member, with a same depth from a respective one of opposite edges of the strip-shaped member; and wherein the full-width region is formed in a spiral shape, and the narrowed-width region is twisted about a longitudinally-extending center line of the strip-shaped member by a given angle.

According to a fifth aspect of the present invention, there is provided a solution transport and cooling unit which comprises: a cooling medium shell; a plurality of heat exchanger tubes disposed inside the cooling medium shell to extend parallel to each other; and a spiral mixing member having a width approximately equal to or slightly less than an inner diameter of each of the heat exchanger tubes and disposed inside each of the heat exchanger tubes, wherein the spiral mixing member is comprised of a strip-shaped member having a full-width region and a narrowed-width region, wherein the narrowed-width region has two cutouts each formed over a given length in a longitudinal direction of the strip-shaped member, with a same depth from a respective one of opposite edges of the strip-shaped member; and wherein the full-width region is formed in a spiral shape, and the narrowed-width region is twisted about a longitudinally-extending center line of the strip-shaped member by a given angle.

BRIEF DESCRIPTION OF DRAWINGS

FIGS. 4(a) to 4(e) are explanatory front views of a production process of a spiral mixing member of the heat-exchanging and mixing device in the first embodiment.

FIG. 5 is a partially-enlarged explanatory front view depicting the spiral mixing member of the heat-exchanging and mixing device in the first embodiment.

FIG. 6 is an explanatory front view depicting the spiral mixing member of the heat-exchanging and mixing device in the first embodiment.

FIGS. 9(a) and 9(b) are perspective views depicting other modifications of the spiral mixing member of the heat-exchanging and mixing device in the first embodiment.

FIGS. 10(a) to 10(e) are explanatory front views of a production process of a spiral mixing member of the heat-exchanging and mixing device in a solution transport and cooling unit according to a second embodiment of the present invention.

FIG. 11 is a perspective view depicting the spiral mixing member of the heat-exchanging and mixing device in the second embodiment.

FIG. 12 is an explanatory front view depicting the spiral mixing member of the heat-exchanging and mixing device in the second embodiment.

DESCRIPTION OF EMBODIMENTS

First Embodiment

Based on the drawings, a solution transport and cooling unit according to a first embodiment of the present invention will now be described. It should be noted that any numerical value in the "DESCRIPTION OF EMBODIMENTS" is described by way of example only.

The solution transport and cooling unit 1 according to the first embodiment is a shell-and-tube type unit having a heat exchange function and used as a pressure container for implementing a polyethylene medium/low-pressure polymerization process. As the shell-and-tube type heat exchanger, there have been known three types consisting of a fixed tube sheet type, a floating head type and a U-tube type. The solution transport and cooling unit 1 is a floating head type configured to absorb an elongation and contraction of a long heat exchanger tube due to high temperatures and high pressures of a heat-exchange target fluid, by means of displacement of a floating head.

Figure 1:
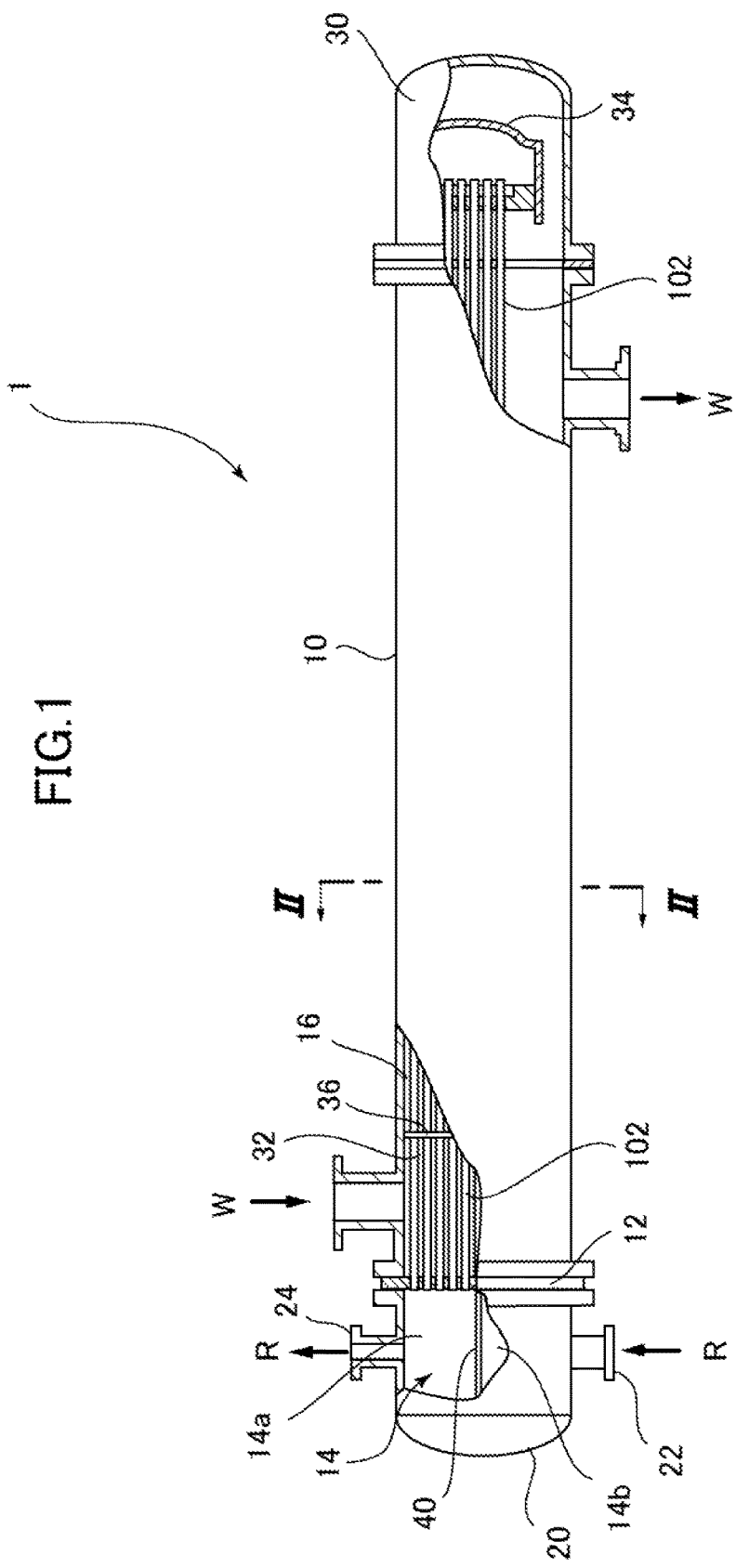
FIG. 1 is a partially-cutaway front view depicting a solution transport and cooling unit according to a first embodiment of the present invention.

As depicted in FIG. 1, the solution transport and cooling unit 1 comprises a unit body or cooling medium shell 10 whose internal space is divided into a heat-exchange target fluid chamber or solution chamber 14, and a cooling medium chamber 16, by a heat exchanger tube support plate 12.

Then, the solution chamber 14 containing a heat-exchange target fluid or solution R is defined by closing one end of the coolant shell 10 with a shell cover 20. A portion of the cooling medium shell 10 corresponding to the solution chamber 14 has a solution inlet port 22 disposed on a lower side thereof, and a solution outlet port 24 disposed on an upper side thereof. Further, the solution chamber 14 is divided into a low-temperature upper sub-chamber 14a and a high-temperature lower sub-chamber 14b by a separator plate 40.

Examples of the solution R include a solution of a polymer dissolved in n-hexane.

Figure 2:
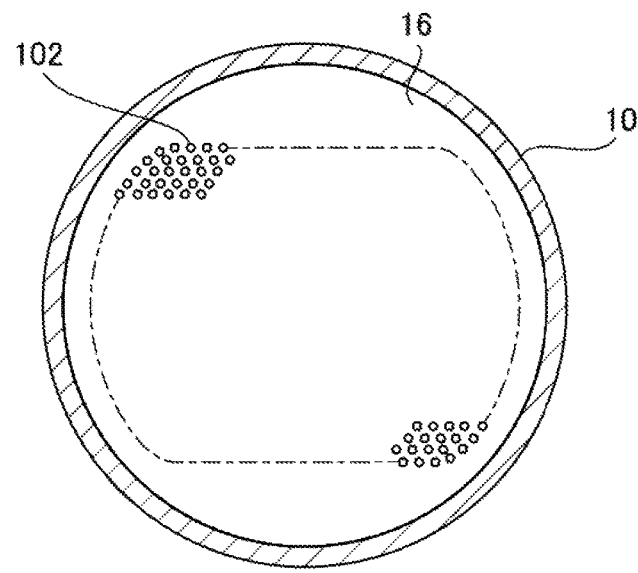
FIG. 2 is a sectional view taken along the line II-II in FIG. 1.

As depicted in FIGS. 1 and 2, the cooling medium chamber 16 containing a cooling medium W such as cooling water is defined by closing the other end of the cooling medium shell 10 with a cooling medium chamber cover 30. In the internal space of the cooling medium shell 10, a plurality of (e.g., about 2000) heat exchanger tubes 102 are arranged to extend parallel to each other. In the cooling medium chamber 16, a floating head cover 34 is disposed on a side opposite to the heat exchanger tube support plate 12. The cooling medium chamber 16 is internally provided with a baffle plate 36 for stirring the cooling medium W.

Each of the heat exchanger tubes 102 as a cooling medium flow passage has a length of 10 m, an outer diameter of 25.4 mm, a wall thickness of 2.0 mm and an inner diameter of 21.4 mm.

Figure 3:
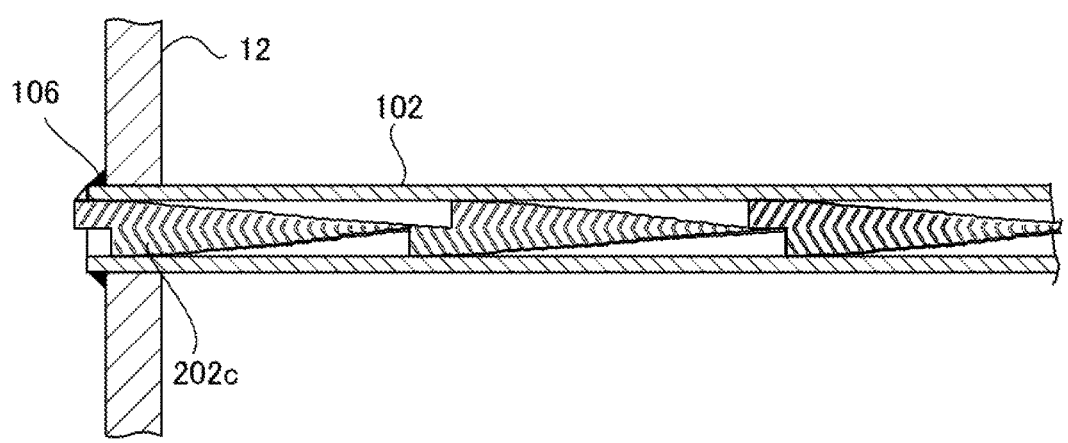
FIG. 3 is a sectional view depicting a heat exchanger tube of a heat exchanger tube of a heat-exchanging and mixing device in the first embodiment.

As depicted in FIG. 3, the heat exchanger tube 102 is fixedly attached to the heat exchanger tube support plate 12 fixed to an inside of the cooling medium shell 10 at a position adjacent to each of the ends of the cooling medium shell 10, by welding 106.

As depicted in FIG. 3, each of the heat exchanger tubes 102 is internally provided with a slit-formed spiral mixing member 202c. The slit-formed spiral mixing member 202c has a width of 21.30 mm which is approximately equal to the inner diameter of the heat exchanger tube 102. As depicted in FIG. 3, at least one end of the slit-formed spiral mixing member 202c is crimped so as to be fixedly attached to a corresponding end of the heat exchanger tube 102.

A production method for the slit-formed spiral mixing member 202c will be described below. As depicted in FIG. 4(a), the slit-formed spiral mixing member 202c is produced from a flat strip-shaped member 202a made of a stainless alloy exemplified by stainless steel such as SUS 300 series, an aluminum alloy, a copper alloy, a titanium alloy, a nickel alloy or the like.

The strip-shaped member 202a is subjected to undulation processing for providing repetitive undulation such as a sine curve in a longitudinal direction, i.e., a direction of a longitudinally-extending center line O of the strip-shaped member 202a, and thereby formed as an undulated plate member 202b, as depicted in FIG. 4(b). The undulation processing is performed using double helical gear-type pressing means, and thereby a resulting undulation is bent along the center line O.

The repetitive undulation may be formed to linearly extend in a direction orthogonal to the center line O, or may be formed to linearly extend on both sides of the center line O and intersect the center line O at an angle other than a right angle. The undulated plate member 202b has stretchability at least in opposite edge regions thereof.

The undulated plate member 202b is formed to have an inter-slit region 100 as depicted in FIG. 4(c). A portion of the undulated plate member 202b other than the inter-slit region 100 is a full-width region 112. In the inter-slit region 100, a pair of slits 104 are formed along respective longitudinally spaced-apart boundary lines to extend from respective ones of opposite edges to the center line O of the undulated plate member 202b.

As enlargedly depicted in FIG. 5, assume that a right half portion and a left half portion of the undulated plate member 202b on one side of, e.g., located upstream of the inter-slit region 100, are defined, respectively, as AR and AL. Further, assume that a right half portion and a left half portion of the inter-slit region 100 are defined, respectively, as BR and BL. Furthermore, assume that a right half portion and a left half portion of the undulated plate member 202b located downstream of the inter-slit region 100 are defined, respectively, as CR and CL.

Then, as depicted in FIG. 4(d), the inter-slit region 100 is relatively bent such that the right half portion BR orthogonally intersects the left half portion GL on the center line O. Considering a temperature property and a viscosity of a heat-exchange target, i.e., a solution, a specific gravity and a size of a mixed solid therein, and others, this bending angle may be set to an angle other than the right angle, within the range of 60 to 150 degrees. In this case, it is also possible to efficiently perform mixing and heat transfer. In this bending, flushness (continuous flatness) of the upstream right half portion AR and the upstream left half portion AR, flushness of the upstream right half portion AR and the right half portion BR of the inter-slit region 100, flushness of the downstream right half portion CR and the downstream left half portion CR, and flushness of the downstream left half portion CL and the left half portion BL of the inter-slit region 100 are maintained.

Then, as depicted in FIG. 4(e) the full-width region 112 is twisted about the center line, e.g., by 90 degrees, and formed in a spiral shape. This twisting angle may be set to an angle other than the right angle, considering a temperature property and a viscosity of a heat-exchange target, i.e., a solution, a specific gravity and a size of a mixed solid therein, and others. In this case, it is also possible to efficiently perform mixing and heat transfer.

As depicted in FIG. 6, the slit-formed spiral mixing member 202c formed in the above manner is inserted into the heat exchanger tube 102 having an inner diameter approximately equal to the width thereof. It should be noted that in the slit-formed spiral mixing member 202c depicted in FIG. 6, the twisting angle described with reference to FIG. 4(e) is set to 180 degrees. The width of the slit-formed spiral mixing member 202c is approximately equal to the inner diameter of the heat exchanger tube 102, so that a central axis O of the slit-formed spiral mixing member 202c is coincident with a central axis O' of the heat exchanger tube 102.

From a viewpoint of minimizing an installation area of the heat exchanger tube 102, and removing a non-effective portion for mixing and heat transfer effects to improve mixing efficiency and heat transfer efficiency, it is significantly advantageous that the heat exchanger tube 102 is continuous and bendable. However, even if the heat exchanger tube 102 can be bent or curved, the central axis O of the slit-formed spiral mixing member 202c is likely to be deviated from the central axis O' of the heat exchanger tube 102. In this case, it is assumed that desired mixing cannot be performed, causing deterioration in heat transfer efficiency.

In this embodiment, at least the opposite edge regions of the slit-formed spiral mixing member 202c have stretchability, and a central axis of the inter-slit region 100 of the slit-formed spiral mixing member 202c is coincident with the central axis O of the slit-formed spiral mixing member 202c, so that even when the slit-formed spiral mixing member 202c is bent or curved to some extent, the coincidence between the central axis O of the slit-formed spiral mixing member 202c and the central axis O' of the heat exchanger tube 102 is maintained.

(Modifications)

Figure 7:
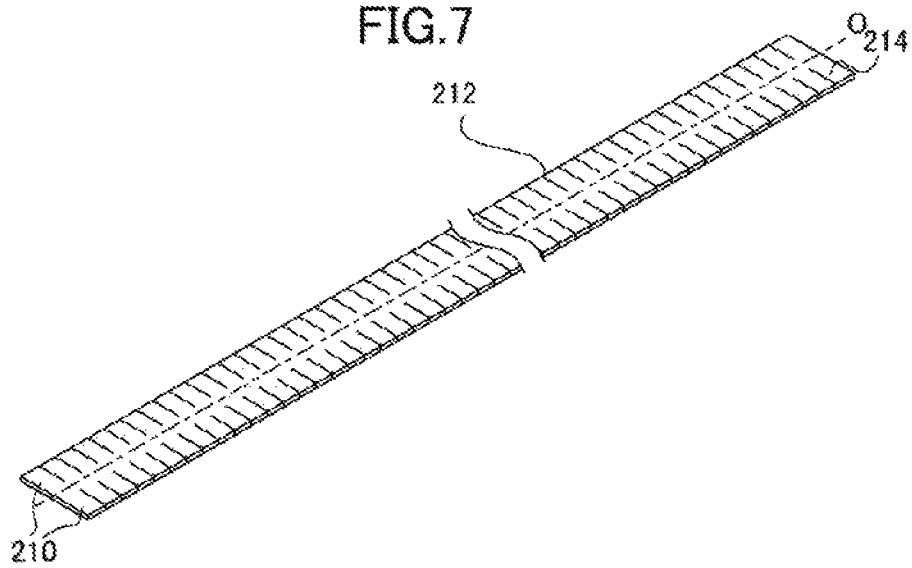
FIG. 7 is a perspective view depicting one modification of the spiral mixing member of the heat-exchanging and mixing device in the first embodiment.

The strip-shaped member 202a may be substituted by a flat plate-like member 214 in which a large number of slits 212 are formed in opposite edge regions thereof each extending in a direction of a longitudinally-extending center line O of the flat plate-like member 214, as depicted in FIG. 7.

Figure 8:
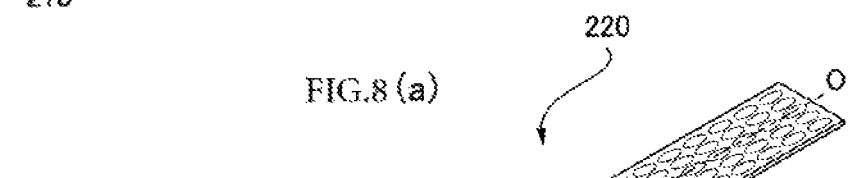
FIGS. 8(a) and 8(b) are perspective views depicting other modifications of the spiral mixing member of the heat-exchanging and mixing device in the first embodiment.
Figure 8:
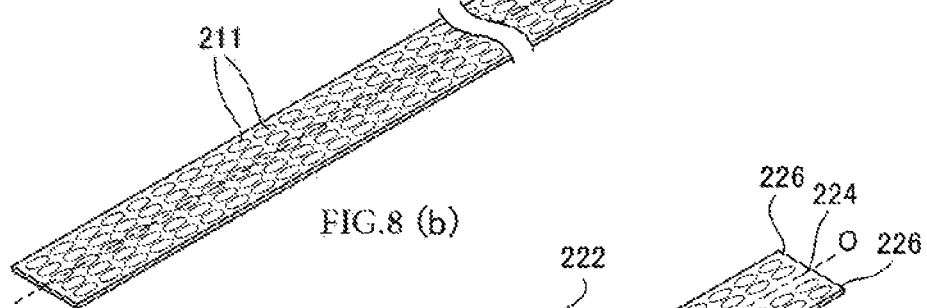

Alternatively, the strip-shaped member 202a may be substituted by a first embossed flat plate-like member 220 having a plurality of embossed dimples 211 formed in the entire surface thereof by embossing, as depicted in FIG. 8(a), or may be substituted by a second embossed flat plate-like member 222 having a plurality of embossed dimples 211 formed by embossing at least in a region on both sides of a longitudinally-extending center line O thereof, i.e., in opposite edge regions 226 each extending in a direction of the center line O, as depicted in FIG. 8(b).

In the first embossed flat plate-like member 220 and the second embossed flat plate-like member 222, a portion 224 on the center line O is almost not stretched in the direction of the center line O, because the embossed dimples 211 prevent deformation thereof. On the other hand, in the opposite edge regions 226 each extending in the direction of the center line O, the embossed dimples allows deformation thereof, so that the opposite edge regions 226 can be stretched and thereby formed as a spiral-shaped embossed spiral member stretched linearly as a whole.

Alternatively, the strip-shaped member 202a may be substituted by a mesh plat plate-like member 230, as depicted in FIGS. 9(a) and 9(b). As depicted in FIG. 9(a), the mesh plat plate-like member 230 is formed using a flat plate-like mesh plate. As depicted in FIG. 9(b), the mesh plat plate-like member 230 is subjected to undulation processing for providing repetitive undulation in a longitudinal direction, i.e., in a direction of a longitudinally-extending center line O thereof, and thereby formed as a mesh undulated member 232.

The mesh undulated member 232 is spirally twisted about the center line O, and thereby formed as a mesh spiral plate. In this process, a woven mesh in a portion 234 on the center line O is almost not enlarged or stretched in the center line O, whereas a woven mesh in opposite edge regions 236 each extending in the center line O is enlarged or stretched, so that the mesh undulated member 232 is formed in a linearly stretched spiral shape.

Second Embodiment

Based on the drawings, a solution transport and cooling unit according to a second embodiment of the present invention will be described below.

The solution transport and cooling unit according to the second embodiment is different from the first embodiment in that the slit-formed spiral mixing member 202c inserted in the heat exchanger tube 102 is substituted by a cutout-formed spiral mixing member 500.

A cutout-formed spiral mixing member 500 is produced from a flat strip-shaped member 502a made of stainless steel such as SUS 300 series, an aluminum alloy, a copper alloy, a titanium alloy, a nickel alloy or the like, as depicted in FIG. 10(a).

The strip-shaped member 502a is subjected to undulation processing for providing repetitive undulation such as a sine curve, in a longitudinal direction, i.e., a direction of a longitudinally-extending center line O of the strip-shaped member 502a, and thereby formed as an undulated plate member 502b, as depicted in FIG. 10(b). The undulation processing is performed using double helical gear-type pressing means, and thereby a resulting undulation is bent along the center line O.

The repetitive undulation may be formed to linearly extend in a direction orthogonal to the center line O, or may be formed to linearly extend on both sides of the center line O and intersect the center line O at an angle other than a right angle. The undulated plate member 502b has stretchability at least in opposite edge regions thereof.

The undulated plate member 502b is formed to have a cutout region 510 as depicted in FIG. 10(c). A portion of the undulated plate member 502b other than the cutout region 510 is a full-width region 512. In the cutout region 510, a plurality of pairs of cutouts 504 each having a depth which is one half of a distance between each edge and the center line O of the undulated plate member 502b are formed at given intervals in the longitudinal direction.

Then, the cutout region 510 is twisted about the center line O by 90 degrees, as depicted in FIG. 10(d). Subsequently, each of the fill-width regions 512 is twisted about the center line O by an angle of 30 to 360 degrees, e.g., by 90 degrees.

As depicted in FIG. 12, the cutout-formed spiral mixing member 500 formed in the above manner is inserted into the heat exchanger tube 102 having an inner diameter approximately equal to a width thereof. The width of the cutout-formed spiral mixing member 500 is approximately equal to the inner diameter of the heat exchanger tube 102, so that a central axis O of the cutout-formed spiral mixing member 500 is coincident with the central axis O' of the heat exchanger tube 102.

From a viewpoint of minimizing an installation area of the heat exchanger tube 102, and removing a non-effective portion for mixing and heat transfer effects to improve mixing efficiency and heat transfer efficiency, it is significantly advantageous that the heat exchanger tube 102 is continuous and bendable. However, even if the heat exchanger tube 102 can be bent or curved, the central axis O of the cutout-formed spiral mixing member 500 is likely to be deviated from the central axis O' of the heat exchanger tube 102. In this case, it is assumed that desired mixing cannot be performed, causing deterioration in heat transfer efficiency.

In this embodiment, at least the opposite edge regions of the cutout-formed spiral mixing member 500 have stretchability, and the cutout region 510 is longitudinally short, so that even when the heat exchanger tube is bent or curved to some extent, the coincidence between the central axis O of the cutout-formed spiral mixing member 500 and the central axis O' of the heat exchanger tube 102 is maintained.

LIST OF REFERENCE SIGNS

R: solution
W: cooling medium
O: center line
1: solution transport and cooling unit
10: cooling medium shell
12: heat exchanger tube support plate
14: solution chamber
16: cooling medium chamber
20: shell cover
22: solution inlet port
24: solution outlet port
30: cooling medium chamber cover
102: heat exchanger tube
100: inter-slit region
104: slit
112: full-width region
202a: strip-shaped member
202b: undulated plate member
202c: slit-formed spiral mixing member
500: cutout-formed spiral mixing member
502a: strip-shaped member
510: cutout region
512: full-width region

The invention claimed is:

1. A heat-exchanging and mixing device comprising a heat exchanger tube and a spiral mixing member having a width approximately equal to an inner diameter of the heat exchanger tube and disposed inside the heat exchanger tube, the spiral mixing member being comprised of a strip-shaped member having an inter-slit region in which a pair of slits are provided along respective longitudinally spaced-apart boundary lines to alternately extend from respective given ones of opposite edges to a widthwise central region of the strip-shaped member;

wherein, on an assumption that: a right half portion and a left half portion of the strip-shaped member located upstream of the inter-slit region are defined, respectively, as an upstream right strip portion and an upstream left strip portion; a right half portion and a left half portion of the inter-slit region of the strip-shaped member are defined, respectively, as an inter-slit right strip portion and an inter-slit left strip portion; and a right half portion and a left half portion of the strip-shaped member located downstream of the inter-slit region are defined, respectively, as a downstream right strip portion and a downstream left strip portion, the inter-slit right strip portion and the inter-slit left strip portion are relatively bent to form a given angle therebetween, in such a manner that, in the inter-slit region and a vicinity thereof, the upstream right strip portion, the upstream left strip portion and the inter-slit right strip portion form a flat surface, and the downstream right strip portion, the downstream left strip portion and the inter-slit left strip portion form a flat surface; and wherein a portion of the strip-shaped member other than the inter-slit region is at least partially formed in a spiral shape.

2. A solution transport and cooling unit comprising: a cooling medium shell; a plurality of heat exchanger tubes disposed inside the cooling medium shell to extend parallel to each other; and a spiral mixing member having a width approximately equal to an inner diameter of each of the heat exchanger tubes and disposed inside each of the heat exchanger tubes, the spiral mixing member being comprised of a strip-shaped member having an inter-slit region in which a pair of slits are provided along respective longitudinally spaced-apart boundary lines to alternately extend from respective given ones of opposite edges to a widthwise central region of the strip-shaped member;

wherein, on an assumption that: a right half portion and a left half portion of the strip-shaped member located upstream of the inter-slit region are defined, respectively, as an upstream right strip portion and an upstream left strip portion; a right half portion and a left half portion of the inter-slit region of the strip-shaped member are defined, respectively, as an inter-slit right strip portion and an inter-slit left strip portion; and a right half portion and a left half portion of the strip-shaped member located downstream of the inter-slit region are defined, respectively, as a downstream right strip portion and a downstream left strip portion, the inter-slit right strip portion and the inter-slit left strip portion are relatively bent to form a given angle therebetween, in such a manner that, in the inter-slit region and a vicinity thereof, the upstream right strip portion, the upstream left strip portion and the inter-slit right strip portion form a flat surface, and the downstream right strip portion, the downstream left strip portion and the inter-slit left strip portion form a flat surface; and wherein a portion of the strip-shaped member other than the inter-slit region is at least partially formed in a spiral shape.

3. The device as recited in claim 1, wherein the heat exchanger tube is bent or curved.

4. The device as recited in claim 1, wherein the spiral mixing member is composed of a plate-like member having stretchability in a longitudinal direction thereof.

5. The device as recited in claim 1, wherein the spiral mixing member is composed of a plate-like member having an undulated shape in a longitudinal direction thereof and a non-undulated shape in a lateral direction thereof.

6. The solution transport and cooling unit as recited in claim 2, wherein the spiral mixing member is composed of a mesh sheet, the mesh sheet being woven such that a tensile resistance in opposite edge regions extending in a longitudinal direction thereof becomes greater than a tensile resistance in a central region extending in the longitudinal direction thereof.

7. The device as recited in claim 1, wherein the spiral mixing member has an array of dimples arranged from right and left edges thereof toward a central axis of the heat exchanger tube.

8. The device as recited in claim 1, wherein the spiral mixing member is made of a stainless alloy.

9. The device as recited in claim 1, wherein the spiral mixing member is made of an aluminum alloy.

10. The device as recited in claim 1, wherein the spiral mixing member is made of a copper alloy.

11. The device as recited in claim 1, wherein the spiral mixing member is made of a titanium alloy.

12. The device as recited in claim 1, wherein the spiral mixing member is made of a nickel alloy.

13. A polymer production apparatus comprising a polymerization reactor, and a cooling flow passage unit having a heat exchange function and coupled to a polymerization product outlet of the polymerization reactor, the cooling flow passage unit comprising: a cooling medium shell; a plurality of heat exchanger tubes disposed inside the cooling medium shell to extend parallel to each other; and a spiral mixing member having a width approximately equal to an inner diameter of each of the heat exchanger tubes and disposed inside each of the heat exchanger tubes, the spiral mixing member being comprised of a strip-shaped member having an inter-slit region in which a pair of slits are provided along respective longitudinally spaced-apart boundary lines to alternately extend from respective given ones of opposite edges to a widthwise central region of the strip-shaped member;

wherein, on an assumption that: a right half portion and a left half portion of the strip-shaped member located upstream of the inter-slit region are defined, respectively, as an upstream right strip portion and an upstream left strip portion; a right half portion and a left half portion of the inter-slit region of the strip-shaped member are defined, respectively, as an inter-slit right strip portion and an inter-slit left strip portion; and a right half portion and a left half portion of the strip-shaped member located downstream of the inter-slit region are defined, respectively, as a downstream right strip portion and a downstream left strip portion, the inter-slit right strip portion and the inter-slit left strip portion are relatively bent to form a given angle therebetween, in such a manner that, in the inter-slit region and a vicinity thereof, the upstream right strip portion, the upstream left strip portion and the inter-slit right strip portion form a flat surface, and the downstream right strip portion, the downstream left strip portion and the inter-slit left strip portion form a flat surface; and wherein a portion of the strip-shaped member other than the inter-slit region is at least partially formed in a spiral shape.

* * * * *